(12) United States Patent
Higgins et al.

(10) Patent No.: US 9,063,844 B2
(45) Date of Patent: Jun. 23, 2015

(54) NON-VOLATILE MEMORY MANAGEMENT SYSTEM WITH TIME MEASURE MECHANISM AND METHOD OF OPERATION THEREOF

(75) Inventors: James Higgins, Chandler, AZ (US); James Fitzpatrick, Sudbury, MA (US); Mark Dancho, Chandler, AZ (US)

(73) Assignee: SMART STORAGE SYSTEMS, INC., Chandler, AZ (US)

( * ) Notice: Subject to any disclaimer, the term of this patent is extended or adjusted under 35 U.S.C. 154(b) by 153 days.

(21) Appl. No.: 13/599,241

(22) Filed: Aug. 30, 2012

(65) Prior Publication Data

US 2013/0060994 A1   Mar. 7, 2013

Related U.S. Application Data

(60) Provisional application No. 61/530,809, filed on Sep. 2, 2011.

(51) Int. Cl.
| | |
|---|---|
| *G06F 13/00* | (2006.01) |
| *G06F 13/28* | (2006.01) |
| *G06F 12/00* | (2006.01) |
| *G06F 12/02* | (2006.01) |
| *G06F 3/06* | (2006.01) |

(52) U.S. Cl.
CPC .......... *G06F 12/0246* (2013.01); *G06F 3/0644* (2013.01); *G06F 2212/7205* (2013.01)

(58) Field of Classification Search
CPC ... G06F 3/0644; G06F 3/0653; G06F 3/0649; G06F 12/0246; G06F 2212/7205; G06F 2212/7201

USPC ......... 711/103, 105, 106, 136, 158, 160, 170, 711/115, 165, E12.002; 714/16, E11.117; 707/737, E17.089; 710/36; 713/1; 365/45, 189.001, 185.33
See application file for complete search history.

(56) References Cited

U.S. PATENT DOCUMENTS

| | | | |
|---|---|---|---|
| 4,048,481 | A | 9/1977 | Bailey, Jr. et al. |
| 4,839,587 | A | 6/1989 | Flatley et al. |
| 5,034,744 | A | 7/1991 | Obinata |
| 5,210,854 | A | 5/1993 | Beaverton et al. |

(Continued)

FOREIGN PATENT DOCUMENTS

| | | | |
|---|---|---|---|
| EP | 1 956 489 A2 | 8/2008 | |
| EP | 1 990 921 A2 | 11/2008 | |

(Continued)

OTHER PUBLICATIONS

Shiraz et al., "Block Aging Prevention Technique (BAP) for Flash Based Solid State Disks," 7th International Conference on Emerging Technologies (ICET), Sep. 5, 2011, 6 pages.*

(Continued)

*Primary Examiner* — Arpan P. Savla
*Assistant Examiner* — Shane Woolwine
(74) *Attorney, Agent, or Firm* — Morgan, Lewis & Bockius LLP (57) ABSTRACT

A method of operation of a non-volatile memory management system includes: selecting a specific time period by a unit controller; establishing a first time pool having super blocks written during the specific time period; and promoting to a second time pool, the super blocks from the first time pool, at the lapse of the specific time period.

20 Claims, 5 Drawing Sheets

(56) References Cited

U.S. PATENT DOCUMENTS

| | | |
|---|---|---|
| 5,311,395 A | 5/1994 | McGaha et al. |
| 5,450,354 A | 9/1995 | Sawada et al. |
| 5,479,638 A | 12/1995 | Assar et al. |
| 5,784,174 A | 7/1998 | Fujino et al. |
| 5,790,828 A | 8/1998 | Jost |
| 5,930,504 A | 7/1999 | Gabel |
| 5,949,785 A | 9/1999 | Beasley |
| 5,963,983 A | 10/1999 | Sakakura et al. |
| 6,091,652 A | 7/2000 | Haehn et al. |
| 6,275,436 B1 | 8/2001 | Tobita et al. |
| 6,345,367 B1 | 2/2002 | Sinclair |
| 6,356,447 B2 | 3/2002 | Scafidi |
| 6,381,670 B1 | 4/2002 | Lee et al. |
| 6,412,080 B1 | 6/2002 | Fleming et al. |
| 6,529,997 B1 | 3/2003 | Debiez et al. |
| 6,552,581 B1 | 4/2003 | Gabara |
| 6,587,915 B1 | 7/2003 | Kim |
| 6,618,249 B2 | 9/2003 | Fairchild |
| 6,661,503 B1 | 12/2003 | Yamaguchi et al. |
| 6,728,913 B1 | 4/2004 | Parker |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,871,304 B2 | 3/2005 | Hadjihassan et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,298,888 B2 | 11/2007 | Hamar |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,613,871 B2 | 11/2009 | Tanaka et al. |
| 7,620,710 B2 | 11/2009 | Kottomtharayil et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,693,422 B2 | 4/2010 | Alicherry et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,979,614 B1 | 7/2011 | Yang |
| 8,000,135 B1 | 8/2011 | Perlmutter et al. |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,209,677 B2 | 6/2012 | Shintani et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,250,621 B2 | 8/2012 | Cha |
| 8,254,172 B1 | 8/2012 | Kan |
| 8,259,506 B1 | 9/2012 | Sommer et al. |
| 8,289,801 B2 | 10/2012 | Smith et al. |
| 8,296,534 B1 | 10/2012 | Gupta et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,860 B2 | 2/2013 | Tseng et al. |
| 8,407,409 B2 | 3/2013 | Kawaguchi |
| 8,464,106 B2 | 6/2013 | Filor et al. |
| 8,503,238 B1 | 8/2013 | Wu et al. |
| 8,601,203 B2 | 12/2013 | Holbrook et al. |
| 8,612,804 B1 | 12/2013 | Kang et al. |
| 8,661,184 B2 | 2/2014 | Wood et al. |
| 8,832,506 B2 | 9/2014 | Griffin et al. |
| 2002/0056025 A1 | 5/2002 | Qiu et al. |
| 2002/0159285 A1 | 10/2002 | Morley et al. |
| 2003/0033308 A1 | 2/2003 | Patel et al. |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0088511 A1 | 5/2004 | Bacon et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2005/0076102 A1 | 4/2005 | Chen et al. |
| 2005/0144516 A1 | 6/2005 | Gonzalez et al. |
| 2006/0015683 A1 | 1/2006 | Ashmore et al. |
| 2006/0020745 A1 | 1/2006 | Conley et al. |
| 2006/0022054 A1 | 2/2006 | Elhamias et al. |
| 2006/0136682 A1 | 6/2006 | Haridas et al. |
| 2006/0143365 A1 | 6/2006 | Kikuchi |
| 2006/0143475 A1 | 6/2006 | Herbert et al. |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0050536 A1 | 3/2007 | Kolokowsky |
| 2007/0061511 A1 | 3/2007 | Faber |
| 2007/0067598 A1 | 3/2007 | Fujimoto |
| 2007/0083779 A1 | 4/2007 | Misaka et al. |
| 2007/0226592 A1 | 9/2007 | Radke |
| 2007/0234004 A1 | 10/2007 | Oshima et al. |
| 2007/0260811 A1 | 11/2007 | Merry, Jr. et al. |
| 2007/0263444 A1 | 11/2007 | Gorobets et al. |
| 2007/0276973 A1 | 11/2007 | Tan et al. |
| 2008/0046630 A1 | 2/2008 | Lasser |
| 2008/0052446 A1 | 2/2008 | Lasser et al. |
| 2008/0082736 A1 | 4/2008 | Chow et al. |
| 2008/0126720 A1 | 5/2008 | Danilak |
| 2008/0183918 A1 | 7/2008 | Dhokia et al. |
| 2008/0189588 A1 | 8/2008 | Tanaka et al. |
| 2008/0313505 A1 | 12/2008 | Lee et al. |
| 2009/0006900 A1 | 1/2009 | Lastras-Montano et al. |
| 2009/0019321 A1 | 1/2009 | Radke |
| 2009/0070651 A1 | 3/2009 | Diggs et al. |
| 2009/0083587 A1 | 3/2009 | Ng et al. |
| 2009/0089485 A1 | 4/2009 | Yeh |
| 2009/0091990 A1 | 4/2009 | Park et al. |
| 2009/0109786 A1 | 4/2009 | Ye et al. |
| 2009/0138654 A1 | 5/2009 | Sutardja |
| 2009/0146721 A1 | 6/2009 | Kurooka et al. |
| 2009/0157948 A1 | 6/2009 | Trichina et al. |
| 2009/0164702 A1* | 6/2009 | Kern ............................ 711/103 |
| 2009/0164649 A1 | 6/2009 | Choi et al. |
| 2009/0172262 A1 | 7/2009 | Olbrich et al. |
| 2009/0179707 A1 | 7/2009 | Higashino |
| 2009/0228634 A1 | 9/2009 | Nakamura et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0271562 A1 | 10/2009 | Sinclair |
| 2009/0287975 A1 | 11/2009 | Kim et al. |
| 2009/0300238 A1 | 12/2009 | Panabaker et al. |
| 2009/0323419 A1 | 12/2009 | Lee et al. |
| 2009/0327581 A1 | 12/2009 | Coulson |
| 2009/0327591 A1 | 12/2009 | Moshayedi |

(56) References Cited

U.S. PATENT DOCUMENTS

| | | | |
|---|---|---|---|
| 2010/0017650 A1 | 1/2010 | Chin et al. | |
| 2010/0023674 A1 | 1/2010 | Aviles | |
| 2010/0050053 A1 | 2/2010 | Wilson et al. | |
| 2010/0122019 A1 | 5/2010 | Flynn et al. | |
| 2010/0128537 A1 | 5/2010 | Suhail et al. | |
| 2010/0138592 A1 | 6/2010 | Cheon | |
| 2010/0165689 A1 | 7/2010 | Rotbard et al. | |
| 2010/0169541 A1* | 7/2010 | Freikorn | 711/103 |
| 2010/0172179 A1 | 7/2010 | Gorobets et al. | |
| 2010/0174845 A1 | 7/2010 | Gorobets et al. | |
| 2010/0217898 A1 | 8/2010 | Priborsky et al. | |
| 2010/0217915 A1 | 8/2010 | O'Connor et al. | |
| 2010/0228928 A1 | 9/2010 | Asnaashari et al. | |
| 2010/0262792 A1 | 10/2010 | Hetzler et al. | |
| 2010/0262795 A1 | 10/2010 | Hetzler et al. | |
| 2010/0262875 A1 | 10/2010 | Hetzler et al. | |
| 2010/0287328 A1 | 11/2010 | Feldman et al. | |
| 2010/0293367 A1 | 11/2010 | Berke et al. | |
| 2010/0312954 A1 | 12/2010 | Jeon et al. | |
| 2010/0318719 A1 | 12/2010 | Keays et al. | |
| 2010/0332726 A1 | 12/2010 | Wang | |
| 2011/0002224 A1 | 1/2011 | Tamura | |
| 2011/0016239 A1 | 1/2011 | Stenfort | |
| 2011/0055468 A1 | 3/2011 | Gonzalez et al. | |
| 2011/0066788 A1 | 3/2011 | Eleftheriou et al. | |
| 2011/0072423 A1 | 3/2011 | Fukata | |
| 2011/0078393 A1 | 3/2011 | Lin | |
| 2011/0099342 A1 | 4/2011 | Ozdemir | |
| 2011/0131365 A1 | 6/2011 | Zhang et al. | |
| 2011/0131447 A1 | 6/2011 | Prakash et al. | |
| 2011/0132000 A1 | 6/2011 | Deane et al. | |
| 2011/0145473 A1 | 6/2011 | Maheshwari | |
| 2011/0161775 A1 | 6/2011 | Weingarten | |
| 2011/0190963 A1 | 8/2011 | Glassl et al. | |
| 2011/0191522 A1 | 8/2011 | Condict et al. | |
| 2011/0191649 A1 | 8/2011 | Lim et al. | |
| 2011/0209032 A1 | 8/2011 | Choi et al. | |
| 2011/0238892 A1 | 9/2011 | Tsai et al. | |
| 2011/0239088 A1 | 9/2011 | Post | |
| 2011/0258496 A1 | 10/2011 | Tseng et al. | |
| 2011/0314219 A1 | 12/2011 | Ulrich et al. | |
| 2011/0320687 A1 | 12/2011 | Belluomini et al. | |
| 2012/0008401 A1 | 1/2012 | Katz et al. | |
| 2012/0011336 A1 | 1/2012 | Saika | |
| 2012/0047318 A1 | 2/2012 | Yoon et al. | |
| 2012/0047320 A1 | 2/2012 | Yoo et al. | |
| 2012/0047409 A1 | 2/2012 | Post et al. | |
| 2012/0066450 A1 | 3/2012 | Yochai et al. | |
| 2012/0124046 A1 | 5/2012 | Provenzano | |
| 2012/0124273 A1 | 5/2012 | Goss et al. | |
| 2012/0151260 A1 | 6/2012 | Zimmermann et al. | |
| 2012/0170365 A1 | 7/2012 | Kang et al. | |
| 2012/0213004 A1 | 8/2012 | Yun et al. | |
| 2012/0216085 A1 | 8/2012 | Weingarten et al. | |
| 2012/0236656 A1 | 9/2012 | Cometti | |
| 2012/0239858 A1 | 9/2012 | Melik-Martirosian | |
| 2012/0254686 A1 | 10/2012 | Esumi et al. | |
| 2012/0266048 A1 | 10/2012 | Chung et al. | |
| 2012/0278530 A1 | 11/2012 | Ebsen | |
| 2012/0284587 A1 | 11/2012 | Yu et al. | |
| 2012/0297113 A1 | 11/2012 | Belluomini et al. | |
| 2012/0311402 A1 | 12/2012 | Tseng et al. | |
| 2012/0324191 A1* | 12/2012 | Strange et al. | 711/165 |
| 2012/0331207 A1 | 12/2012 | Lassa et al. | |
| 2013/0007380 A1 | 1/2013 | Seekins et al. | |
| 2013/0007543 A1 | 1/2013 | Goss et al. | |
| 2013/0054881 A1 | 2/2013 | Ellis et al. | |
| 2013/0060994 A1 | 3/2013 | Higgins et al. | |
| 2013/0073788 A1 | 3/2013 | Post et al. | |
| 2013/0080691 A1 | 3/2013 | Weingarten et al. | |
| 2013/0094289 A1 | 4/2013 | Sridharan et al. | |
| 2013/0100600 A1 | 4/2013 | Yin et al. | |
| 2013/0124792 A1 | 5/2013 | Melik-Martirosian et al. | |
| 2013/0151753 A1 | 6/2013 | Jeon et al. | |
| 2013/0198436 A1 | 8/2013 | Bandic et al. | |
| 2013/0238833 A1 | 9/2013 | Vogan et al. | |
| 2013/0265825 A1* | 10/2013 | Lassa | 365/185.11 |
| 2013/0332791 A1 | 12/2013 | Chu | |
| 2014/0108891 A1 | 4/2014 | Strasser et al. | |
| 2014/0129874 A1 | 5/2014 | Zaltsman et al. | |
| 2014/0208174 A1 | 7/2014 | Ellis et al. | |

FOREIGN PATENT DOCUMENTS

| | | |
|---|---|---|
| EP | 2 498 259 A2 | 9/2012 |
| JP | 2012129859 A | 7/2012 |
| WO | WO 2009/042298 | 4/2009 |
| WO | WO 2011/156466 | 12/2011 |

OTHER PUBLICATIONS

Ulinketec, "ATA Command Table (in Alphabetic Order)," Feb. 6, 2011, https://web.archive.org/web/20110206060820/http://www.ulinktech.com/downloads/AT, 6 pages.

International Search Report and Written Opinion dated May 14, 2014, received in International Patent Application No. PCT/US2014/017168, which corresponds to U.S. Appl. No. 14/076,115, 6 pages (Fitzpatrick).

International Search Report and Written Opinion dated May 14, 2014, received in International Patent Application No. PCT/US2014/017169, which corresponds to U.S. Appl. No. 14/076,148, 6 pages (Fitzpatrick).

International Search Report dated Mar. 25, 2014, received in International Patent Application No. PCT/US2013/072400, which corresponds to U.S. Appl. No. 13/690,337, 3 pages (Ellis).

International Search Report and Written Opinion dated Jun. 12, 2014, received in PCT/US2014/018972, which corresponds to U.S. Appl. No. 13/779,352, 12 pages (Schmier).

Invitation to Pay Additional Fees dated Jul. 25, 2014, received in International Patent Application No. PCT/US2014/021290, which corresponds to U.S. Appl. No. 13/791,797, 8 pages (Dean).

International Search Report and Written Opinion dated Jul. 31, 2014, received in International Patent Application No. PCT/US2014/031465, which corresponds to U.S. Appl. No. 13/851,928, 13 pages (Ellis).

International Search Report and Written Opinion dated Jul. 31, 2014, received in International Patent Application No. PCT/US2014/033876, which corresponds to U.S. Appl. No. 13/861,326, 9 pages (Fitzpatrick).

Cooke, "Introduction to Flash Memory (T1A)," Flash Memory Summit, Aug. 22, 2008, Micron Technology, Inc., 102 pages.

Gal et al., "Algorithms and Data Structures for Flash Memories," ACM Computing Surveys, Jun. 2005, vol. 37, No. 2, 30 pages.

IBM Corporation, "Systems Management, Work Management," Version 5, Release 4, 9th Edition, Feb. 2006, pp. 1-21.

O'Brien, "SMART Storage Systems Optimus SAS Enterprise SSD Review," SMART Storage Systems, Oct. 9, 2012, 44 pages.

Spanjer, "Flash Management—Why and How?" Smart Modular Technologies, Nov. 2009, http://www.scantec.de/fileadmin/pdf/Smart_Modular/Flash-Management.pdf, 14 pages.

Texas Instruments, "Power Management IC for Digital Set Top Boxes," SLVSA10A, Sep. 2009, pp. 1-22.

International Search Report and Written Opinion dated Dec. 20, 2013, received in PCT/US2013/045282, which corresponds to U.S. Appl. No. 13/493,949, 7 pages (Ellis).

Narayanan et al., "Migrating Server Storage to SSDs: Analysis of Tradeoffs," Computer Systems, Apr. 2009, 12 pages.

Tai et al, "Prolongation of Lifetime and the Evaluation Method of Dependable SSD," 25 International Symposium on Defect and Fault Tolerance in VLSI Systems, 2010, NJ, USA, 8 pages.

Tseng et al., "Understanding the Impact of Power Loss on Flash Memory," DAC'11, Jun. 5-10, 2011, San Diego, California, 6 pages.

Yimo et al., "WeLe—RAID: A SSD-Based RAID for System Endurance and Performance," Jan. 2011, Network and Parallel Computing, Springer, 14 pages.

International Search Report and Written Opinion dated Jan. 9, 2015, received in International Patent Application No. PCT/US2014/049731, which corresponds to U.S. Appl. No. 14/334,324, 9 pages (Fitzpatrick).

(56) References Cited

OTHER PUBLICATIONS

International Search Report and Written Opinion dated Nov. 7, 2014, received in International Patent Application No. PCT/US2014/049732, which corresponds to U.S. Appl. No. 14/334,350, 13 pages (Fitzpatrick).

International Search Report and Written Opinion dated Oct. 17, 2014, received in International Patent Application No. PCT/US2014/049734, which corresponds to U.S. Appl. No. 14/332,259, 8 pages (Higgins).

International Search Report and Written Opinion dated Oct. 23, 2014, received in International Patent Application No. PCT/US2014/049736, which corresponds to U.S. Appl. No. 14/446,249 8 pages (Fitzpatrick).

International Search Report and Written Opinion dated Aug. 22, 2014, received in International Patent Application No. PCT/US2014/032978, which corresponds to U.S. Appl. No. 14/081,992, 10 pages (Ellis).

International Search Report and Written Opinion dated Feb. 18, 2015, received in International Patent Application No. PCT/US2014/065401, which corresponds to U.S. Appl. No. 14/082,031, 9 pages (Higgins).

International Search Report dated Apr. 15, 2014, received in International Patent Application No. PCT/US2013/078340, which corresponds to U.S. Appl. No. 13/746,542, 11 pages (Ellis).

International Search Report and Written Opinion dated Nov. 5, 2014, received in International Patent Application No. PCT/US2014/049282, which corresponds to U.S. Appl. No. 13/957,407 12 pages (Fitzpatrick).

* cited by examiner

NON-VOLATILE MEMORY MANAGEMENT SYSTEM WITH TIME MEASURE MECHANISM AND METHOD OF OPERATION THEREOF

CROSS-REFERENCE TO RELATED APPLICATION(S)

This application claims the benefit of U.S. Provisional Patent Application Ser. No. 61/530,809 filed Sep. 2, 2011, and the subject matter thereof is incorporated herein by reference thereto.

TECHNICAL FIELD

The present invention relates generally to a non-volatile memory management system, and more particularly to a system for managing erase blocks within a non-volatile memory management system.

BACKGROUND ART

Flash memory devices have developed into a popular source of non-volatile memory for a wide range of electronic applications. Flash memory devices typically use a one-transistor memory cell that allows for high memory densities, high reliability, and low power consumption. Changes in threshold voltage of the cells, through programming of charge storage or trapping layers or other physical phenomena, determine the data value of each cell. Common uses for flash memory and other non-volatile memory include personal computers, personal digital assistants (PDAs), digital cameras, digital media players, digital recorders, games, appliances, vehicles, wireless devices, cellular telephones, and removable memory modules, and the uses for non-volatile memory continue to expand.

Flash memory typically utilizes one of two basic architectures that are known as NOR flash and NAND flash. The designation is derived from the logic used to read the devices. In NOR flash architecture, a column of memory cells are coupled in parallel with each memory cell coupled to a bit line. In NAND flash architecture, a column of memory cells are coupled in series with only the first memory cell of the column coupled to a bit line.

Flash memory and other non-volatile memories are often grouped into sections called "erase blocks." Each of the cells within an erase block can be electrically programmed selectively by altering the threshold voltage of an individual cell from an initial state. However, cells of the erase block are erased, or reverted to their initial state, generally in a single operation across the entire block. Any data in the erase block that is desired to be retained by the memory device must first be copied to another location or buffer before performing the erase operation.

In part because of their large block sizes, NAND devices are primarily used for storing data, such as audio, video or image files. Such files are frequently read, but generally infrequently modified. Increasingly, however, NAND devices are being designed into embedded systems. Such systems have need for code and temporary parameter storage as well as data storage. However, code and parameter data requires relatively frequent modification, requiring frequent and extensive movement or buffering of the data in a block that is to be retained. As memory densities continue to increase, block sizes are also tending to increase, thus exacerbating this problem.

Thus, a need still remains for a non-volatile memory management system. In view of the expanding applications of non-volatile memory into dynamic data management systems, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a non-volatile memory management system including: selecting a specific time period by a unit controller; establishing a first time pool having super blocks written during the specific time period; and promoting to a second time pool, the super blocks from the first time pool, at the lapse of the specific time period.

The present invention provides a non-volatile memory management system, including: a unit controller for selecting a specific time period; a non-volatile memory array configured by the unit controller for establishing a first time pool having super blocks written during the specific time period; and a system control random access memory coupled to the unit controller for promoting to a second time pool the super blocks from the first time pool at the lapse of the specific time period.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

The term "processing" as used herein includes the storage, manipulation, and retrieval of data on a flash memory system. The term "read disturb" is defined as the process of reducing the total charge held in a flash memory cell by reading its contents. Flash memory cells may become unreliable when the read disturb count is excessive. The term "solid state drive" (SSD) is defined to be a non-volatile memory system having an interface module that presents the non-volatile memory system, to a computer system, as a disk storage device.

The term "erase block" is defined to be a group of flash memory cells that can be accessed, written, read, or erased as a common entity. While the flash memory cells can contain discrete data bits, they are all erased, using common control lines, at approximately the same time.

The term "super block" is defined to mean a grouping of erase blocks into an organized segment in which the erase blocks share similar relative age, endurance, and retention characteristics. This grouping of similar performance erase blocks into super blocks allows the volume of information, used to track read disturbs, to be reduced to a manageable level. The tabling infrastructure and linkages between erase block wear levels and the number of reads to any given erase block can be managed at run time in a volatile random access memory (RAM). When it becomes time to power-off the drive, a secondary read disturb metric will be recorded for use at power-on. This secondary metric is the highest number of reads for any given erase block within a super block. Given that all of the erase blocks have relatively the same wear or age within a super block and that recycling can be done on an entire super block at a time, the need to recycle the most-read block is addressed. This also limits the number of read counts to be saved at power cycles to only one count per super block.

The term "module" referred to herein can include software, hardware, or a combination thereof in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a micro-electromechanical system (MEMS), passive devices, or a combination thereof.

Figure 1:
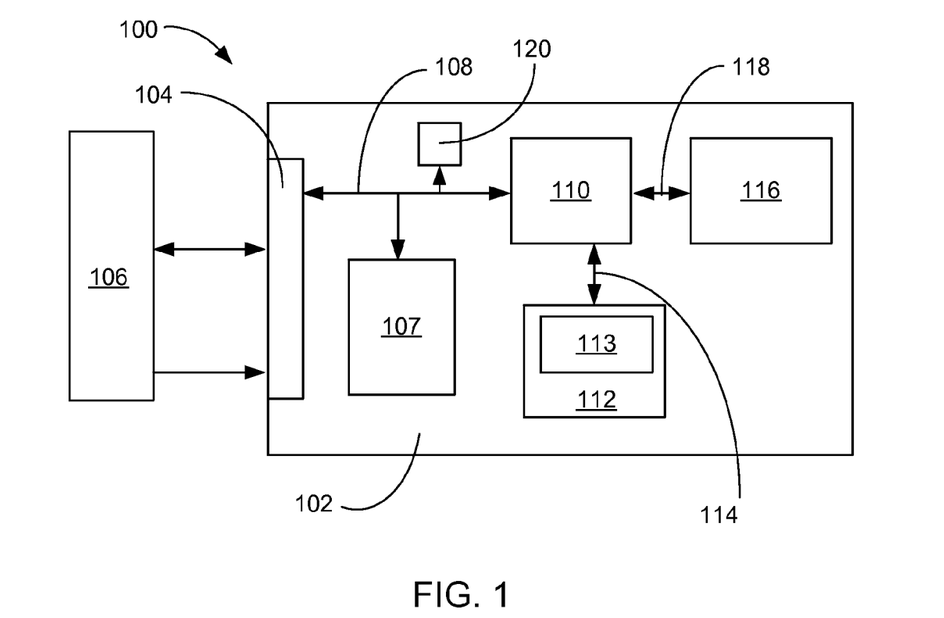
FIG. 1 is a block diagram of a non-volatile memory management system with time measure in an embodiment of the present invention.

Referring now to FIG. 1, therein is shown a block diagram of a non-volatile memory management system 100 with time measure in an embodiment of the present invention. The block diagram of the non-volatile memory management system 100 depicts a system board 102, such as a printed circuit board for mounting and interconnecting the components of the data storage system 100.

A storage system interface 104 can be used to couple the data storage system 100 to a host interface 106. The storage system interface 104 can support protocol management and communication with the next level system. The storage system interface 104 can be a parallel advanced technology attachment (PATA), a serial advanced technology attachment (SATA), serial attached small computer system interface (SAS), personal computer interface express (PCI-E), or the like.

A unit controller 107 is coupled to the storage system interface 104 through a storage bus 108. The unit controller 107 can include a processor, interface logic, local storage, embedded memory, or a combination thereof. The unit controller 107 can communicate with the storage system interface 104 for supporting protocol management, exception handling, initialization, configuration management, or a combination thereof.

The unit controller 107 can also be coupled to a memory controller 110 through the storage bus 108. The memory controller 110 can receive set-up and configuration commands from the unit controller 107. During exception processing the unit controller 107 can closely manage the operation of the memory controller 110. The memory controller 110 can receive data transfer parameters directly from the storage system interface 104 or from the unit controller 107 as a result of processing protocol messages received through the storage system interface 104. The memory controller 110 is also coupled to a system control random access memory (SCRAM) 112, such as a volatile memory, through a volatile memory bus 114.

The system control random access memory 112 is defined as a volatile memory structure for maintaining system control information. Contents 113 of the system control random access memory 112 include metadata, configuration information, and system pointers. The system control random access memory 112 can be managed by the unit controller 107 through the memory controller 110.

It is understood that while the storage system interface 104, the unit controller 107, the memory controller 110, and the system control random access memory 112 are shown as separate functions any combination of them can be provided in a single integrated circuit. It is further understood that the bus structures shown are an example only and additional interconnects between the functions is possible.

The memory controller 110 is also coupled to a non-volatile memory array 116 through a primary storage bus 118. The non-volatile memory array 116 is defined as an array of NAND flash memory devices. It is understood that the array of the NAND flash memory devices can be contained in a single package or in multiple packages due to the total intended capacity of the non-volatile memory management system 100 and the technology node of the non-volatile memory array 116. NAND flash memory devices have a requirement to monitor the conditions that can impact the data read reliability. An erase block (not shown) in the non-volatile memory array 116 can be impacted by reads or writes to an adjacent erase block, the length of time the data has been written into the erase block, temperature, or the combination of all of these. Current approaches only consider the read or write disturbs in adjacent erase blocks without consideration for time or temperature.

The unit controller 107 can receive an indication of the current temperature and the operating voltage applied to the non-volatile memory array 116 by integrating a threshold sensor 120. Based on the input received from the threshold sensor 120, the unit controller 107 can determine an effective time, which indicates the adjusted data age of the erase blocks based on temperature, time since written, read/write disturbs, or a combination thereof.

It has been discovered that the unit controller 107 can configure the memory controller 110 to monitor the erase blocks in the non-volatile memory array 116 for conditions that can degrade the read performance of the erase blocks. The conditions that can degrade the read performance of the erase blocks can include the read/write disturbs, time, temperature, or the combination thereof. By considering all of these conditions, the unit controller 107 can calculate the effective time to optimize the movement of data from an initial erase block to a next erase block. The movement of the data initializes the effective time for the data now written into the next erase block.

Figure 2:
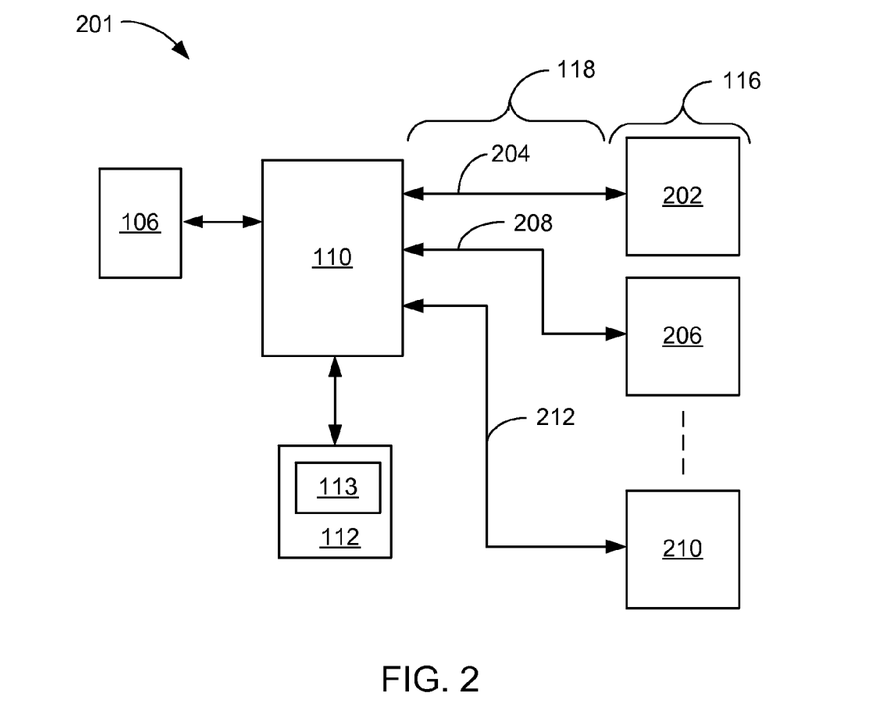
FIG. 2 is a hardware block diagram of the memory control structure of the non-volatile memory management system of FIG. 1.

Referring now to FIG. 2, therein is shown a hardware block diagram of the memory control structure 201 of the non-volatile memory management system 100 of FIG. 1. The hardware block diagram of the memory control structure 201 depicts the memory controller 110 coupled to a first time pool 202 coupled through a first storage channel 204, a second time pool 206 coupled through a second storage channel 208, and an Nth time pool 210 coupled through an Nth storage channel 212. The first storage channel 204, the second storage channel 208, and the Nth storage channel 212 comprise the primary storage bus 118.

The first time pool 202, the second time pool 206, and the Nth time pool 210 comprise the non-volatile memory array 116. The first time pool 202, the second time pool 206, and the Nth time pool 210 are each defined to be a group of erase blocks or super blocks that are written within a specific time period. It is understood that the number of erase blocks or super blocks grouped in the first time pool 202, the second time pool 206, and the Nth time pool 210 can differ based on activity of the host interface 106 during the specified time period. It is also understood that the group of erase blocks can constitute superblocks in high capacity devices. It is further understood that the unit controller 107 of FIG. 1 can establish the specific time period based on the total capacity of the non-volatile memory array 116 and the activity level of the host interface 106.

The unit processor 107 can instruct the memory controller 110 to group all of the erase blocks written within the specific time period into the first time pool 202. The unit processor 107 can calculate the effective time of the first time pool 202 based on read/write disturbs, elapsed time that data has been written into the oldest erase block in the first time pool 202, and the temperature in the operating environment of the first time pool 202.

It has been discovered that the unit controller 107 can calculate and save the effective time of the first time pool 202, the second time pool 206, and the Nth time pool 210 in the contents 113 of the system control random access memory 112. It has further been discovered that unit controller 107 can monitor the effective time of the Nth time pool 210 to determine when the data content of the erase blocks must be copied to a new group of erase blocks in order to preserve the data integrity of the non-volatile memory management system 100. It is understood that contents 113 of the system control random access memory 112 are saved to the non-volatile memory array 116 prior to power-off.

It has further been discovered that a solid state drive (SSD) can group erase blocks and super blocks, forming the first time pool 202, the second time pool 206, and the Nth time pool 210 of the blocks, according to how long the blocks will be able to reliably store data. This grouping can track when a block needs to be recycled for retention due to the age of the data written in the block, and only recycle those blocks that need it. When the block is recycled for some other reason, such as reclaiming space for new writes, managing read disturbs, wear leveling, or recovering from a fault, the recycled block can be taken out of the time pool in which it currently resides and put it the newest time pool.

It is understood that the number of the storage channels is not limited to the number shown in the FIG. 2. The number of the storage channels in the implementation can match the number of the time pools supported by the non-volatile memory management system 100 or it can differ.

Figure 3:
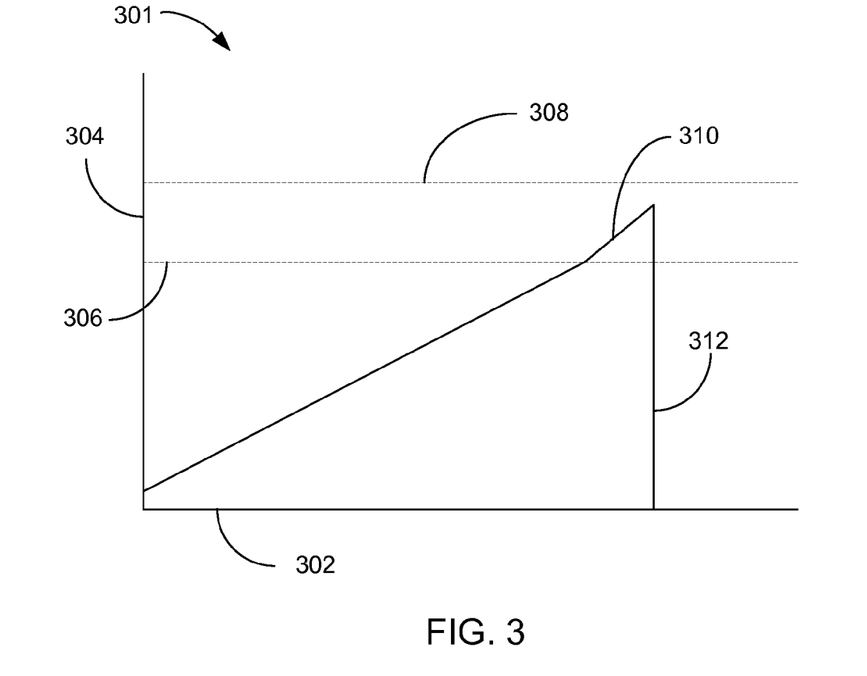
FIG. 3 is a graphical view of data retention thresholds for the non-volatile memory management system of FIG. 1.

Referring now to FIG. 3, therein is shown a graphical view of data retention thresholds 301 for the non-volatile memory management system 100 of FIG. 1. The graphical view of the data retention thresholds 301 depicts a Cartesian coordinate graph having a chronological age 302 of the Nth time pool 210 of FIG. 2 on the X-axis and data age 304 of the Nth time pool 210 on the Y-axis. A data retention recycling threshold 306 is defined to be a measure of the data age 304 at which data reliability relies on error correction because some of the data can be unreliable. A data corruption threshold 308 is defined to be the data age 304 where data recovery is questionable even with the strongest error correction codes.

In order to maintain data integrity, in the non-volatile memory management system 100, all of the erase blocks in the Nth time pool 210 must be transferred to unused erase blocks that are assigned to the first time pool 202 of FIG. 2 prior to reaching the data corruption threshold 308. The data retention recycling threshold 306 and the data corruption threshold 308 are variables dependent on the process technology of the non-volatile memory array 116 of FIG. 1, the voltage applied to the non-volatile memory array 116, the temperature of the non-volatile memory array 116, as well as the elapsed time since the data was written into the erase blocks.

It is understood that some of the parameters, such as the technology response to voltage level and temperature, required for calculating the data retention recycling threshold 306 and the data corruption threshold 308 can be loaded at the time of manufacture. During the operation of the non-volatile memory management system 100, an effective time 310 associated with the data written into the erase blocks can be accelerated beyond the chronological age 302. The effective time 310 can reflect an equivalent aging process of the erase blocks in the non-volatile memory array 116 as the wear due to read/write cycles, voltage, temperature, and time. As an example a new erase block when first written can have the effective time 310 match the chronological age 302, but as the erase block ages due to use the effective time 310 will increase at a faster rate than the chronological age 310.

It has been discovered that by not relying on only the chronological age 302 of the erase blocks the data of the erase blocks can be copied to new erase block before reaching the data corruption threshold 308. By monitoring the effective time 310 a recycle event 312 can initialize the data age 304 by copying the contents of the Nth time pool 210 to unused erase blocks allocated to the first time pool 202 before the data corruption threshold 308 can be reached.

Figure 4:
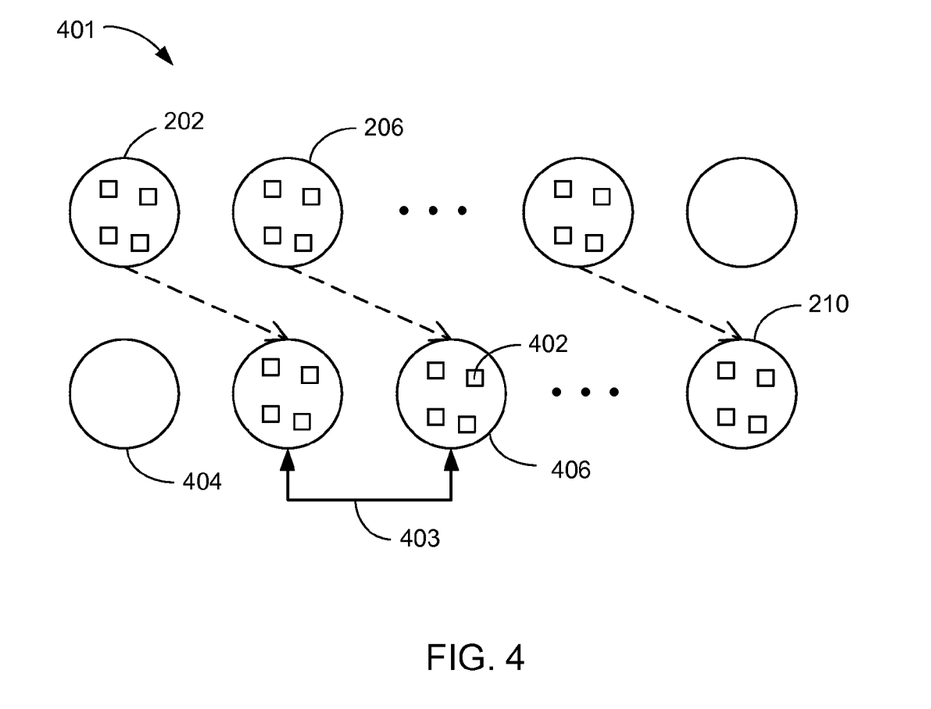
FIG. 4 is a transition diagram of time pools within the non-volatile memory array of FIG. 1.

Referring now to FIG. 4, therein is shown a transition diagram of time pools 401 within the non-volatile memory array 116 of FIG. 1. The transition diagram of the time pools 401 depicts the first time pool 202 having super blocks 402. The first time pool 202 can be active for a specific time period 403, such as eight hours, a day, or a week. During the specific time period 403, all of the super blocks 402 written by the storage system interface 104 of FIG. 1 are committed to the first time pool 202.

It is understood that the selection of the specific time period 403 by the unit controller 107 of FIG. 1 can be based on the total capacity of the non-volatile memory array 116 and the activity level, such as the frequency of write/read operations, of the storage system interface 104. By way of an example a large capacity of the non-volatile memory array 116 and a low frequency of read/write operations through the storage system interface 104 can provide a one week time period selected as the specific time period 403. In contrast, a lower capacity of the non-volatile memory array 116 and a high frequency of read/write operations through the storage system interface 104 can provide an eight hour or less for the specific time period 403. Once the specific time period 403 is selected, by the unit controller 107, it remains a constant interval throughout the operation of the non-volatile memory management system 100 of FIG. 1.

At the end of the specific time period 403, all of the super blocks 402 that are in the first time pool 202 are promoted to the second time pool 206 and the first time pool 202 accepts the next grouping of the super blocks 402 from a spare group of super blocks 404. While the specific time period 403 is constant, the number of the super blocks 402 written by the storage system interface 104 can differ between one of the specific time period 403 and the next instance of the specific time period 403.

At the end of a second instance of the specific time period 403, the super blocks 402 in the second time pool are promoted to a third time pool 406 and the contents of the first time pool 202 are promoted to the second time pool 206. This process continues until the super blocks 402 are promoted to the Nth time pool 210 or the effective time 310 of FIG. 3 exceeds the data retention recycling threshold 306 of FIG. 3. The data from the super blocks 402 associated with the Nth time pool 210 are transferred to the first time pool 202 when the effective time 310 exceeds the data retention recycling threshold 306 or at the commencement of the next instance of the specific time period 403. The super blocks 402 from the Nth time pool 210 are subjected to the recycling process 406 after the data has been transferred to the first time pool 202.

It has been discovered that the segmentation of the super blocks 402 based on the effective time 310 as calculated by the unit processor 107 of FIG. 1 maintains the data integrity of the non-volatile memory management system 100 of FIG. 1 while adding only minimal additional overhead as compared to the usual data retention processes. It has been further discovered that changes in environmental parameters, such as voltage and temperature can be accommodated by adjusting the data retention recycling threshold 306 and the data corruption threshold 308 of FIG. 3 and comparing the effective time 310 for each of the time pools. This abbreviated process can make the unit processor 107 more efficient in preserving the data integrity of the non-volatile memory management system 100.

It is understood that while only a few of the super blocks 402 are shown in each of the first time pool 202, the second time pool 206 and the Nth time pool 210 this is by way of example only and the actual number of the super blocks 402 can differ. It is further understood that during the promotion process between the time pools the unit processor just updates the contents 113 of FIG. 1 in the system control random access memory 112 of FIG. 1 to update the time pool association and compare the effective time 310 of each with the data retention recycling threshold 306 and the data corruption threshold 308.

During a power event, the unit controller 107 can save the contents 113 in the non-volatile memory array 116. By saving the time pool association during power-off events, the unit controller can adjust the effective time 310 of the time pools upon power-on. The association of a super block to a given time pool can also be recorded in a metadata header by the unit controller 107 as it starts writing to new blocks, so at power-off time the time-pool associations are stored in the non-volatile memory array 116 already.

It has been discovered that the power-on adjustment of the effective time 310 can increase the data reliability because the wear, temperature, and operating voltage can vary a deterioration rate between the first time pool 202, the second time pool 206 and the Nth time pool 210. The early detection of the effective time 310 exceeding the data retention recycling threshold 306 can prevent the potential data loss when the erase blocks exceed the data corruption threshold 308.

Figure 5:
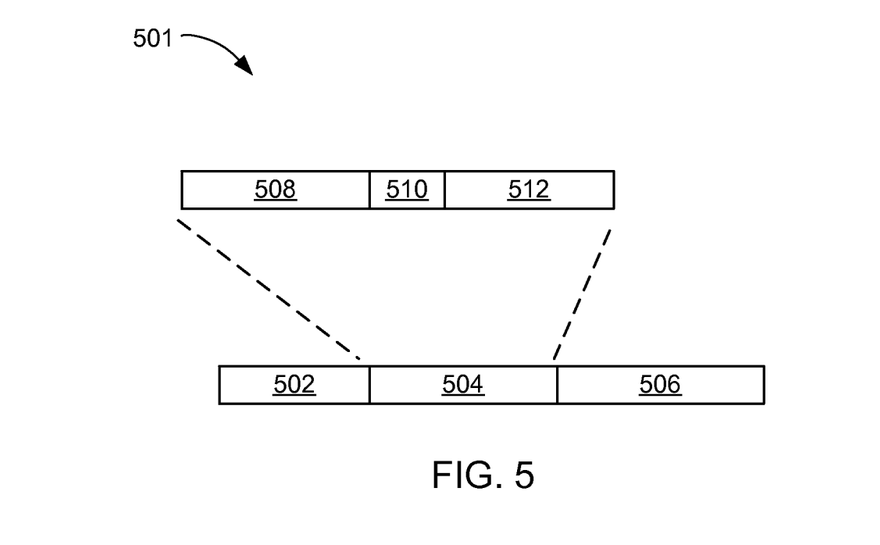
FIG. 5 is a functional bit diagram of an index address of the non-volatile memory array of FIG. 1.

Referring now to FIG. 5, therein is shown a functional bit diagram of an index address 501 of the non-volatile memory array of FIG. 1. The functional bit diagram of the index address 501 can reside within the contents 113 of FIG. 1 of the system control random access memory 112 of FIG. 1 and is considered to be among the system pointers.

The index address 501 includes a page/erase block address 502, an age measurement segment 504, and a test configuration segment 506. The page/erase block address 502 comprises a 32 bit field that can include a super block address, which can correspond to the first time pool 202 of FIG. 2, the second time pool 206 of FIG. 2 and the Nth time pool 210 of FIG. 2.

The age measurement segment 504 is a 32 bit field the comprises a data integrity portion 508 of 16 bits, a super block state portion 510 of two bits, and valid pages portion 512 of 14 bits. The age measurement segment 504 can provide the details required to calculate the effective time of the time pool to which it indexes.

The test configuration segment 506 can include technology aging information for the super blocks 402 of FIG. 2 accessed by the index address 501. The test configuration segment can also include technology parameters for multiple flash memory chips (not shown) that are addressed by the index address 501.

Figure 6:
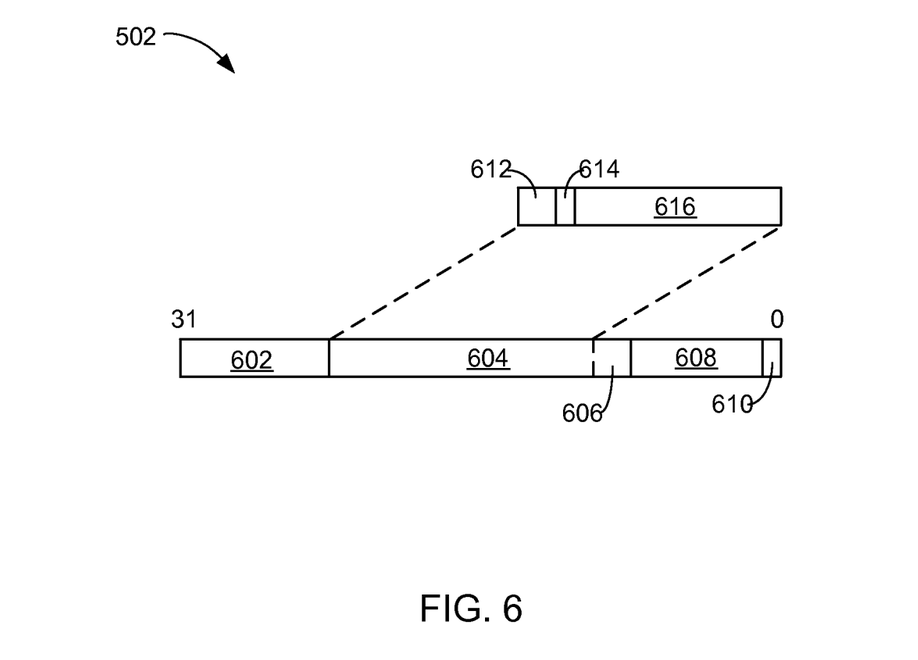
FIG. 6 is a functional bit diagram of the page/erase block address of the index address of FIG. 5.

Referring now to FIG. 6, therein is shown a functional bit diagram of the page/erase block address 502 of the index address 501 of FIG. 5. The functional bit diagram of the page/erase block address 502 depicts a channel select field 602 of eight bits, a physical address field 604 of 16 bits, a chip level plane select field 606 of two bits, a page address field 608 of five bits, and a sub-page bit 610.

Figure 7:
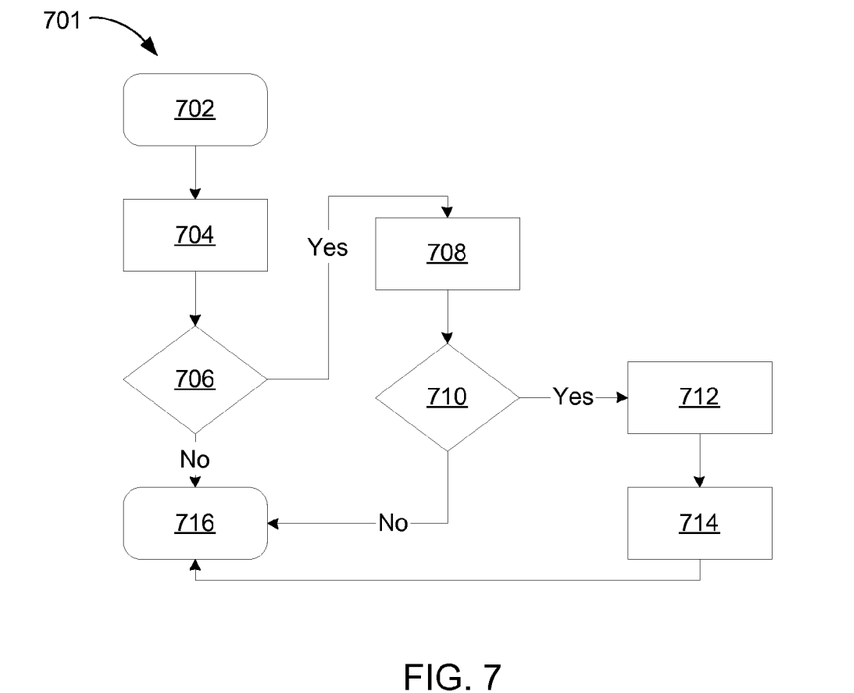
FIG. 7 is a flow diagram of a super block time pool update of the non-volatile memory array of FIG. 1.

The physical address field 604 can include a physical chip select 612 of two bits, a chip enable bit 614, and an erase block address 616 of 13 bits. The physical address field 604 can also be called a super block address 604. Referring now to FIG. 7, therein is shown a flow diagram of a super block time pool update 701 of the non-volatile memory array of FIG. 1. The flow diagram of the super block time pool update 701 depicts a hardware management message interrupt (HMMI) entry point 702. The flow then proceeds to an effective time update module 704. The effective time update module 704 can calculate the effective time 310 of FIG. 3, for each of the time pools, by considering the read/write disturbs, the supporting technology, the temperature, and the operating voltage.

The flow then proceeds to a time complete module 706. The time complete module 706 determines whether the specific time period 403 of FIG. 4 has elapsed. If the specific time period 403 has elapsed the flow proceeds to a promote time pools module 708. Each of the first time pool 202 of FIG. 2, the second time pool 206, of FIG. 2, and the Nth time pool can be promoted to the next available time pool or on the recycle process 406 of FIG. 4.

The flow then proceeds to an Nth time pool used 710 decision block to determine whether the contents of the Nth time pool 210 of FIG. 2 has super blocks that are ready to be transferred to new super blocks. If there are super blocks in the Nth time pool 210, the data content of those super blocks is copied to the first time pool 202 of FIG. 2 and the super blocks are submitted to an add super blocks to recycle list 712. The flow then proceeds to an initiate recycling module 714 where the super blocks are moved to the recycle process 406 of FIG. 4 in order to be recycled for data retention.

An exit from interrupt module 716 completes the interrupt flow and can be entered from the time complete module 706, if the specific time period 403 has not elapsed, the Nth time pool used 710, if no super blocks are present in the Nth time pool 210, and the initiate recycling module 714, when the recycling of the super blocks from the Nth time pool 210 is underway.

The modules of the super block time pool update 701 can be implemented by combinational logic in discrete components, in an application specific integrated circuit, in combinational hardware supported by the unit processor 107 of FIG. 1, or a combination thereof.

It has been discovered that the differences in the innate data retention capabilities of the erase blocks, caused by worn blocks that can't hold data reliably for as long, can be solve by grouping similarly worn erase blocks in time pools that will expire earlier than the newest time pool. This is important because the erase blocks don't age uniformly, and the time pool grouping allows uniform management of the erase blocks without having to promote the time pools for only the worst-case blocks.

Figure 8:
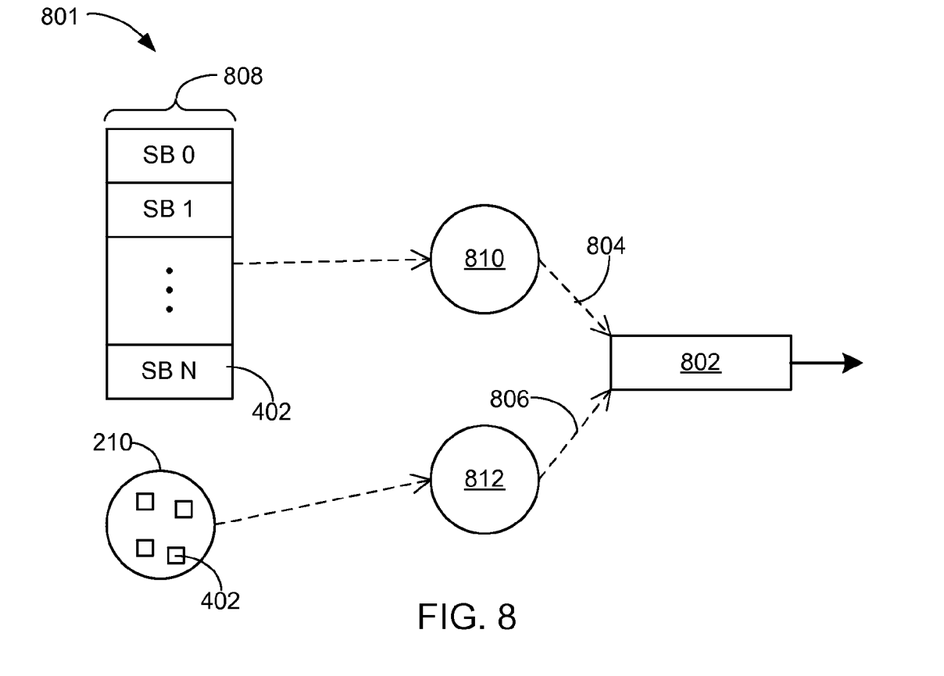
FIG. 8 is an architectural block diagram of an input structure for a data-retention recycling of the non-volatile memory array of FIG. 1.

Referring now to FIG. 8, therein is shown an architectural block diagram of an input structure 801 for a data-retention recycling of the non-volatile memory array of FIG. 1. The architectural block diagram of the input structure 801 depicts a super block recycling module 802 having a high priority input 804 and a lower priority input 806. The super block recycling module 802 can perform an initialization of super blocks 808 including erasing, verifying the quality of the flash cells, and initialization of the super blocks 808 in preparation for reuse.

The high priority input 804 is coupled to a read disturb detection module 810, which compares the number of read disturbs in each of the super blocks 808. When a super block 808 has exceeded the read disturb threshold it has been repeatedly read by the host system and constitutes a high priority to preserve the data for further use by the host interface 106 of FIG. 1.

The lower priority input 806 is coupled to a data retention recycling module 812. The data retention recycling module receives any super blocks 402 that are attributed to the Nth time pool 210. The super blocks 402 from the Nth time pool 210 are submitted due to the deterioration of the data due to time and the environmental parameters. As such the preservation of the data for future use should occur at a lower priority.

Figure 9:
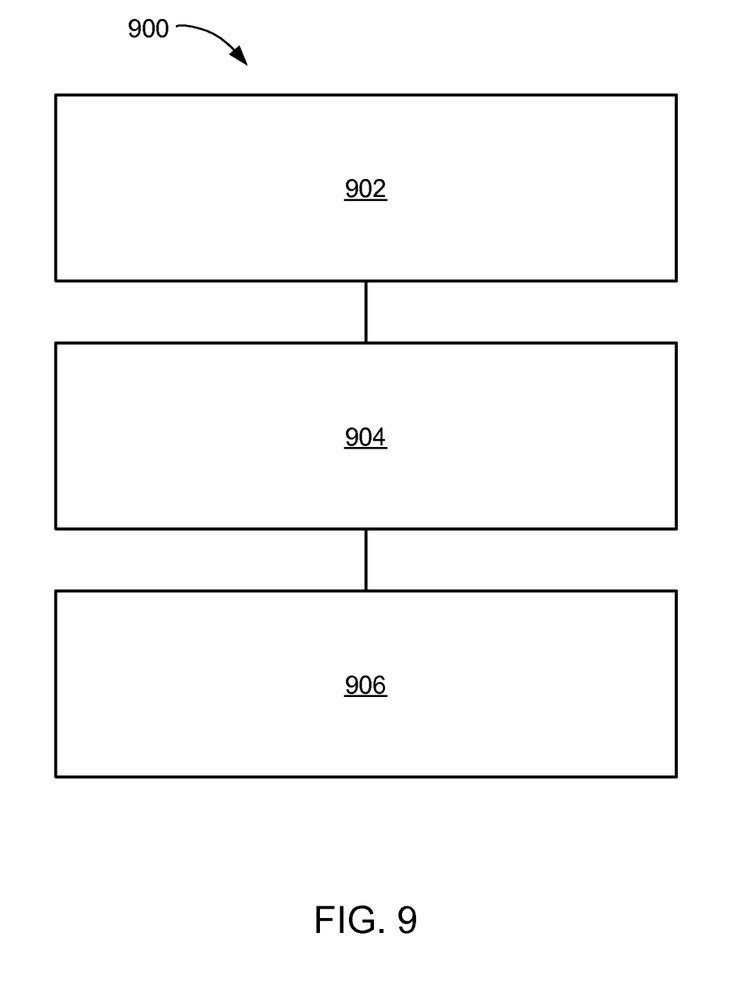
FIG. 9 is a flow chart of a method of operation of a non-volatile memory management system in a further embodiment of the present invention.

Referring now to FIG. 9, therein is shown a flow chart of a method 900 of operation of the non-volatile memory management system 100 of FIG. 1 in a further embodiment of the present invention. The method 900 includes: selecting a specific time period by a unit controller in a block 902; establishing a first time pool having super blocks written during the specific time period in a block 904; and promoting to a second time pool, the super blocks from the first time pool, at the lapse of the specific time period in a block 906.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a non-volatile memory system having a set of memory blocks, the method comprising:
    establishing an ordered set of time pools, including at least three distinct time pools, ordered with respect to data age of data in memory blocks assigned to the respective time pools, the time pools including a first, youngest time pool, a second, next youngest time pool, and an Nth, oldest time pool;
    assigning memory blocks with newly written data to the first time pool;
    at first predefined times, reassigning blocks in each time pool other than the Nth time pool to a next, older time pool; and
    at second predefined times, determined with respect to data age of data in the memory blocks assigned to the Nth time pool, recycling data in the memory blocks assigned to the Nth time pool, including copying the recycled data to respective memory blocks, and assigning the respective memory blocks to the first time pool.

2. The method as claimed in claim 1, including:
    establishing a data retention recycling threshold, and
    in accordance with a determination that the data age of data in the memory blocks assigned to the Nth time pool is greater than the data retention recycling threshold, recycling data in the memory blocks assigned to the Nth time pool.

3. The method as claimed in claim 1 further comprising:
    determining the data age of data in memory blocks assigned to each respective time pool of the ordered set of time pools in accordance with both passage of time and at least one operational characteristic of the non-volatile memory system selected from the set consisting of temperature, operating voltage and read/write disturbs.

4. The method as claimed in claim 1 wherein:
reassigning blocks in each time pool other than the Nth time pool to a next, older time pool includes updating contents of a system control random access memory, wherein the updated contents associate with the second time pool a set of memory blocks previously associated by the contents with the first time pool.

5. The method as claimed in claim 1, wherein the memory blocks assigned to the respective time pools are super blocks, each super block comprising a plurality of erase blocks.

6. The method of claim 1, wherein operation of a non-volatile memory management system comprising:
establishing the ordered set of time pools includes generating an index address having an age measurement segment for a respective time pool.

7. A non-volatile memory system comprising:
a unit controller and a memory controller coupled to the unit controller;
a threshold sensor coupled to the unit controller;
a non-volatile memory array coupled to the memory controller; and
a system control random access memory, coupled to the memory controller;
wherein the unit controller and memory controller are configured to:
establish an ordered set of time pools, including at least three distinct time pools, ordered with respect to data age of data in memory blocks assigned to the respective time pools, the time pools including a first, youngest time pool, a second, next youngest time pool, and an Nth, oldest time pool;
assign memory blocks with newly written data to the first time pool;
at first predefined times, reassign blocks in each time pool other than the Nth time pool to a next, older time pool; and
at second predefined times, determined with respect to data age of data in the memory blocks assigned to the Nth time pool, recycle data in the memory blocks assigned to the Nth time pool, including copying the recycled data to respective memory blocks, and assigning the respective memory blocks to the first time pool.

8. The method as claimed in claim 1, wherein the first predefined times comprise a sequence of times separated by respective time periods, and
wherein each of the respective time periods corresponds to an instance of a specific time period determined in accordance with at least one operational characteristic of the non-volatile memory system selected from the set consisting of capacity and write/read frequency.

9. The method as claimed in claim 1 further comprising:
storing information corresponding to assignments of the memory blocks to respective time pools, and
upon restoring power to the non-volatile memory system after a loss of power,
restoring the stored information corresponding to the assignments of the memory blocks to respective time pools; and
adjusting the data age of data in the memory blocks assigned to the respective time pools in accordance with the loss of power.

10. The method as claimed in claim 2, further comprising adjusting the data retention recycling threshold in accordance with at least one operational characteristic of the non-volatile memory system selected from the set consisting of voltage and temperature.

11. The method as claimed in claim 2, including:
establishing a data corruption threshold which is greater than the data retention recycling threshold, and
in accordance with a determination that the data age of data in the memory blocks assigned to the Nth time pool is greater than the data retention recycling threshold and less than the data retention recycling threshold, recycling data in the memory blocks assigned to the Nth time pool.

12. The system as claimed in claim 7, wherein the system is configured to:
establish a data retention recycling threshold, and
recycle data in the memory blocks assigned to the Nth time pool in accordance with a determination that the data age of data in the memory blocks assigned to the Nth time pool is greater than the data retention recycling threshold.

13. The system as claimed in claim 12, wherein the system is configured to:
adjust the data retention recycling threshold in accordance with at least one operational characteristic of the non-volatile memory system selected from the set consisting of voltage and temperature.

14. The system as claimed in claim 12, wherein the system is configured to:
establish a data corruption threshold which is greater than the data retention recycling threshold, and
recycle data in the memory blocks assigned to the Nth time pool in accordance with a determination that the data age of data in the memory blocks assigned to the Nth time pool is greater than the data retention recycling threshold and less than the data retention recycling threshold.

15. The system as claimed in claim 7, wherein the system is configured to:
determine the data age of data in memory blocks assigned to each respective time pool of the ordered set of time pools in accordance with both passage of time and at least one operational characteristic of the non-volatile memory system selected from the set consisting of temperature and operating voltage,
wherein the at least one operational characteristic is measured by the threshold sensor.

16. The system as claimed in claim 7, wherein the system is configured to:
update contents of the system control random access memory, wherein the updated contents associate with the second time pool a set of memory blocks previously associated by the contents with the first time pool.

17. The system as claimed in claim 7, wherein the memory blocks assigned to the respective time pools are super blocks, each super block comprising a plurality of erase blocks.

18. The system as claimed in claim 7, wherein the system is configured to:
generate an index address having an age measurement segment for a respective time pool.

19. The system as claimed in claim 7, wherein the first predefined times comprise a sequence of times separated by respective time periods, and
wherein each of the respective time periods corresponds to an instance of a specific time period determined in accordance with at least one operational characteristic of the non-volatile memory system selected from the set consisting of capacity and write/read frequency.

20. The system as claimed in claim 7, wherein the system is configured to:
store information corresponding to assignments of the memory blocks to respective time pools, and upon restoring power to the non-volatile memory system after a loss of power,
restore the stored information corresponding to the assignments of the memory blocks to respective time pools; and
adjust the data age of data in the memory blocks assigned to the respective time pools in accordance with the loss of power.

\* \* \* \* \*